(12) United States Patent
Wobben (10) Patent No.: US 7,484,933 B2
(45) Date of Patent: *Feb. 3, 2009

(54) METHOD FOR CONTROLLING A WIND TURBINE

(76) Inventor: Aloys Wobben, Argestrasse 19, Aurich (DE) 26607

( * ) Notice: Subject to any disclaimer, the term of this patent is extended or adjusted under 35 U.S.C. 154(b) by 288 days.

This patent is subject to a terminal disclaimer.

(21) Appl. No.: 11/444,859

(22) Filed: May 31, 2006

(65) Prior Publication Data

US 2006/0216148 A1 Sep. 28, 2006

Related U.S. Application Data (63) Continuation of application No. 10/479,902, filed as application No. PCT/EP02/04485 on May 11, 2004, now Pat. No. 7,101,152.

(30) Foreign Application Priority Data

Jun. 7, 2001 (DE) ................................ 101 27 451

(51) Int. Cl.
F03D 7/04 (2006.01)
(52) U.S. Cl. ........................................... 416/1; 416/44
(58) Field of Classification Search ................ 416/1, 416/37, 43, 44, 61; 290/44, 55
See application file for complete search history.

(56) References Cited

U.S. PATENT DOCUMENTS

| 4,095,120 A | 6/1978 | Moran et al. ................... 290/44 |
| 5,289,041 A | 2/1994 | Holley .......................... 290/44 |
| 5,402,332 A | 3/1995 | Kopf ........................... 364/149 |
| 5,584,655 A | 12/1996 | Deering ........................ 416/31 |
| 6,320,272 B1 | 11/2001 | Lading et al. .................. 290/44 |
| 6,840,734 B2 | 1/2005 | Hansen .......................... 415/1 |
| 7,101,152 B2 * | 9/2006 | Wobben ......................... 416/1 |

FOREIGN PATENT DOCUMENTS

| DE | 19532409 A1 | 3/1997 |
| DE | 19844258 A1 | 3/2000 |
| DE | 19934415 A1 | 2/2001 |
| EP | 0644331 A1 | 3/1995 |
| NZ | 316943 | 11/1998 |
| WO | WO 93/06653 | 4/1993 |

* cited by examiner

*Primary Examiner*—Ninh H Nguyen
(74) *Attorney, Agent, or Firm*—Seed IP Law Group PLLC

(57) ABSTRACT

A method is provided for controlling a wind turbine, and a wind turbine is provided with a control device for controlling a wind turbine. A method and a wind turbine are developed so that losses of yield, particularly as a result of variations in the conversion of the kinetic energy of the wind into electrical energy, e.g., in the rotor, drive train and generator, are minimized as far as possible. A method is provided for controlling a wind turbine, wherein at least one operational setting is varied within predefined limits.

13 Claims, 5 Drawing Sheets

Fig. 3

METHOD FOR CONTROLLING A WIND TURBINE

CROSS-REFERENCE TO RELATED APPLICATION

This application is a continuation of U.S. patent application Ser. No. 10/479,902, filed May 11, 2004, now pending, which application is incorporated herein by reference in its entirety.

TECHNICAL FIELD

The present invention relates to a method for controlling a wind turbine and to a wind turbine with a control device for controlling a wind turbine.

BACKGROUND OF THE INVENTION

Wind turbine with controllers have been generally known for years and are now deployed with success. The controller, especially, has a major influence on the energy yield of a wind turbine.

The continuous development of wind turbines has led to them becoming complex installations in which many parameters and settings must be inter-coordinated to enable optimized operation.

Owing to the high complexity of wind turbines and the enormous costs involved in developing and refining them, purchasing such a wind turbine requires considerable amounts of money. It is easily understandable that such expenses are acceptable only if the wind turbines permit the maximum amount of profit to be generated, in addition to amortization of the investment, from the operating revenues obtained during their service life.

However, this profit is inseparably linked to the power yield of a wind turbine, which is why maximization of power yield has an understandably high priority, especially for the owner and/or the operator of such a turbine.

On the other hand, in all production processes generally, and given the complexity of wind turbine and their dimensions, deviations from the ideal are unavoidable. Tolerance limits are therefore specified as ranges within which such deviations are considered to be still acceptable.

Regardless of the question as to whether such deviations are actually acceptable or not, they always signify a loss of yield in that they imply a divergence from the optimal arrangement.

SUMMARY OF THE INVENTION

The object of the present invention is to develop a method and a wind turbine of the kind initially specified so that losses of yield, particularly as a result of variations in the conversion of the kinetic energy of the wind into electrical energy, i.e. in the rotor, drive train and generator, are minimized as far as possible.

This object is achieved by developing the method of the kind initially specified in such a way that at least one operational setting is varied within predefined limits.

The invention is based on the realization that tolerances move within known ranges and that variation of at least one operational setting, such as the blade pitch angle, the azimuth position, the generator torque, etc. within this tolerance range must therefore lead to the optimal setting.

To avoid a situation in which constant variation of an operational setting ultimately causes even greater loss of yield, these variations are performed at predefinable time intervals so that whenever an optimal setting has been found, this is then maintained for a predefined period.

In one particularly preferred embodiment of the invention, the time intervals are varied in response to predefinable ambient and/or operating conditions, so that special local conditions, such as relatively uniform or turbulent wind flow, changes of wind direction or the like can be taken into account.

In one particularly preferred embodiment of the invention, the variation is performed contemporaneously after a change in an operational setting has been caused by external factors. If the time is sufficiently short, the operational setting is varied beyond the predefined setting and, if necessary, back again by a predetermined amount in the opposite direction until the optimal setting is found. This procedure is very similar to a transient oscillation.

A particularly preferred embodiment of the method according to the invention is one in which the difference between the initial setting and the varied setting with the optimal yield is quantified and taken into consideration for subsequent changes and/or variations. In this way, the time needed for variation and hence for reaching the maximum yield can be shortened.

In a particularly preferred embodiment of the invention, a wind turbine according to the invention has a controller that is suitable for executing the method, said controller having a microprocessor or microcontroller and a memory device.

Other advantageous embodiments of the invention are described in the sub claims.

BRIEF DESCRIPTION OF THE DRAWINGS

One possible embodiment of the invention shall now be described in detail with reference to the drawings. The drawings show.

DETAILED DESCRIPTION OF THE INVENTION

Figure 1:
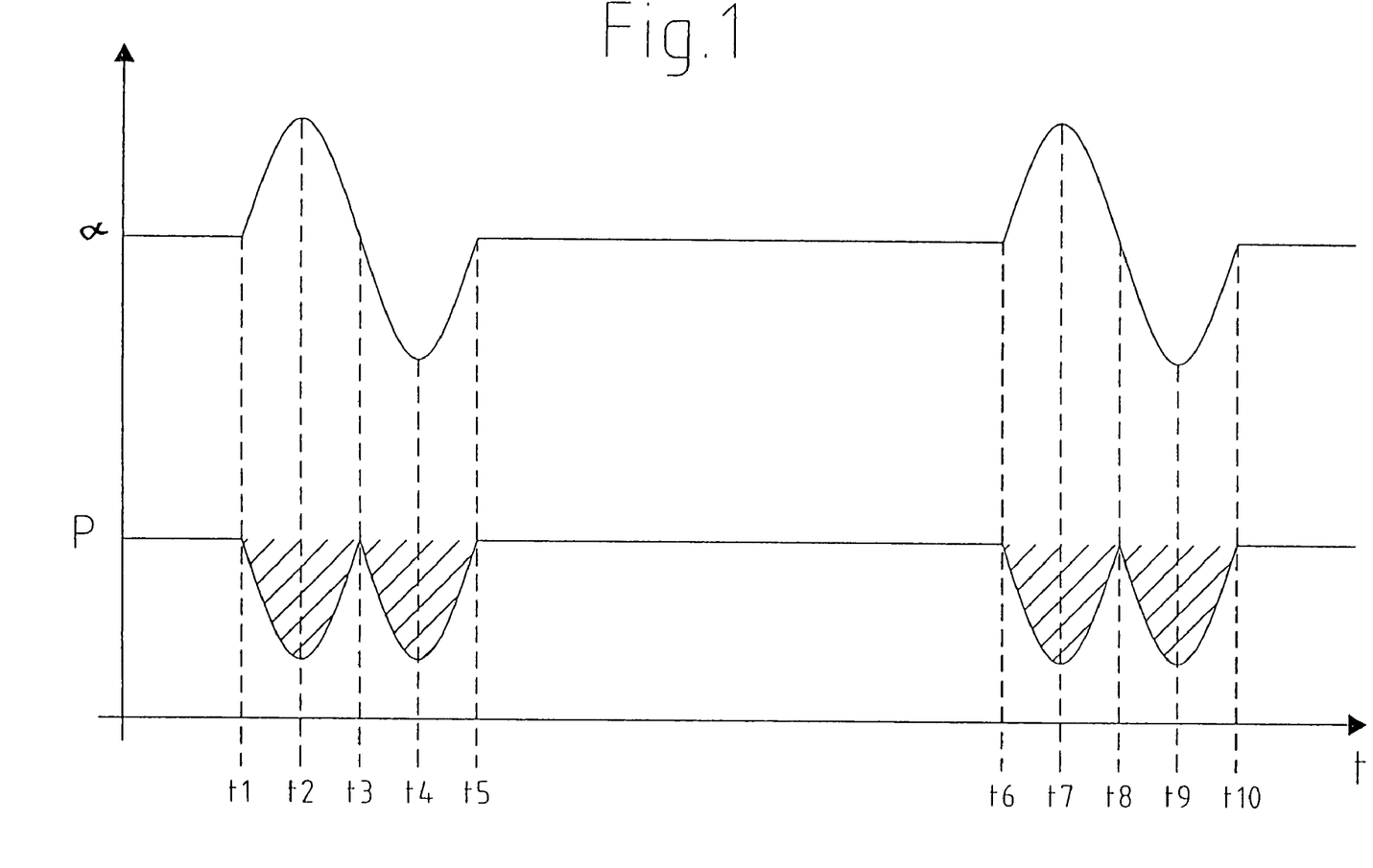
FIG. 1 a timing diagram illustrating the basic principle of the present invention.

FIG. 1 illustrates the basic principle of the method of the invention for controlling a wind turbine. In the Figure, time t is plotted on the x-axis, the upper portion of the y-axis is used to plot the variation of an operational setting, for example the azimuth angle ($\alpha$) of the nacelle and hence of the wind turbine rotor, and the lower portion shows, in simplified form for the sake of clarity, the variation in power yield in the form of a power curve (P).

It can be seen from the upper curve that variation of the operational setting out of its starting position begins initially in a positive direction and with a sinusoidal waveform at time t1, reaches a maximum value at time t2 and at time t3 has returned to the initial value. From there, variation is continued in the opposite direction, reaching a maximum at time t4, and at time t5 has again returned to the initial value.

If an increase in power yield now occurs during such variation, the operational setting may be modified accordingly so that the wind turbine generates a greater yield.

The lower curve shows the variation in power yield depending on the operational setting. At time t1, i.e. when variation commences, the power yield decreases until it reaches the maximum variation at time t2, and while the setting is being returned to the initial value (t3) the yield increases again until it, too, reaches its initial value at time t3. When the direction of variation is reversed, the power yield in the present example also decreases, reaching its minimum (i.e. the maximum decrease in yield) at time t4 and returning at time t5 to its initial value. This behavior is a clear indication that the initial setting of the wind turbine was optimal.

At a predefined time (t6 in this example), after a predefined interval has elapsed, the procedure can be repeated.

In said procedure, there is competition between the possibility of an increase in power yield, on the one hand, and a reduction in yield caused by variation from an optimal setting, on the other hand.

Figure 2:
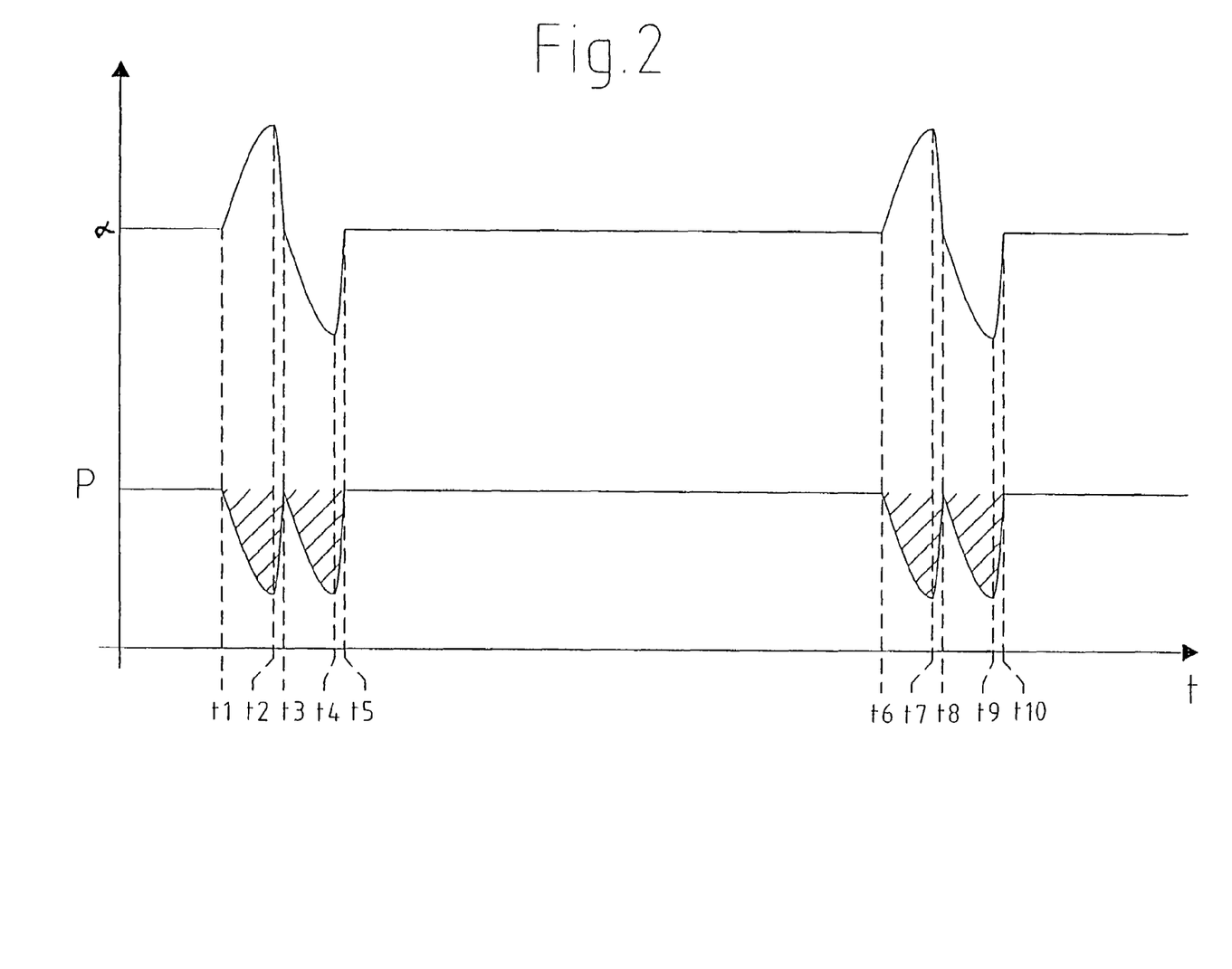
FIG. 2 a timing diagram showing an improved version of the basic principle.

One option for reducing these yield reductions is shown in FIG. 2. In said Figure, time is again plotted on the x-axis, while on the y-axis the upper curve plots the variation of the operational setting and the lower curve plots the variation in power yield.

When the operational setting is varied, the rise from the initial value is still sinusoidal, whereas the edge steepness of the signal increases after reaching the crest value, with the result that the value returns to the initial value as fast as possible. The interval between times t1 and t2 remains substantially unchanged in comparison with FIG. 1; however, the interval between times t2 and t3 is considerably reduced. In the ideal case, the interval between t2 and t3 will tend towards zero, with the result that, in a first approximation at least, the reduction in yield in the interval between times t2 and t3 will also be very small.

The same behavior is repeated for the negative half-wave, the rising edge of which is similarly sinusoidal and occurs between times t3 and t4, while the return to the initial setting again occurs in the period between t4 and t5 with as great a steepness as possible. Accordingly, the reductions in yield are approximately halved in relation. After a predefined interval, this sequence of variations is repeated, commencing at time t6. Given that each setting within the range of variation (the tolerance range) can be reached and evaluated with the sinusoidally increasing curve of each half-wave in the variation, this embodiment reduces the loss of yield caused by variation, without altering the efficiency of the variation itself.

Figure 3:
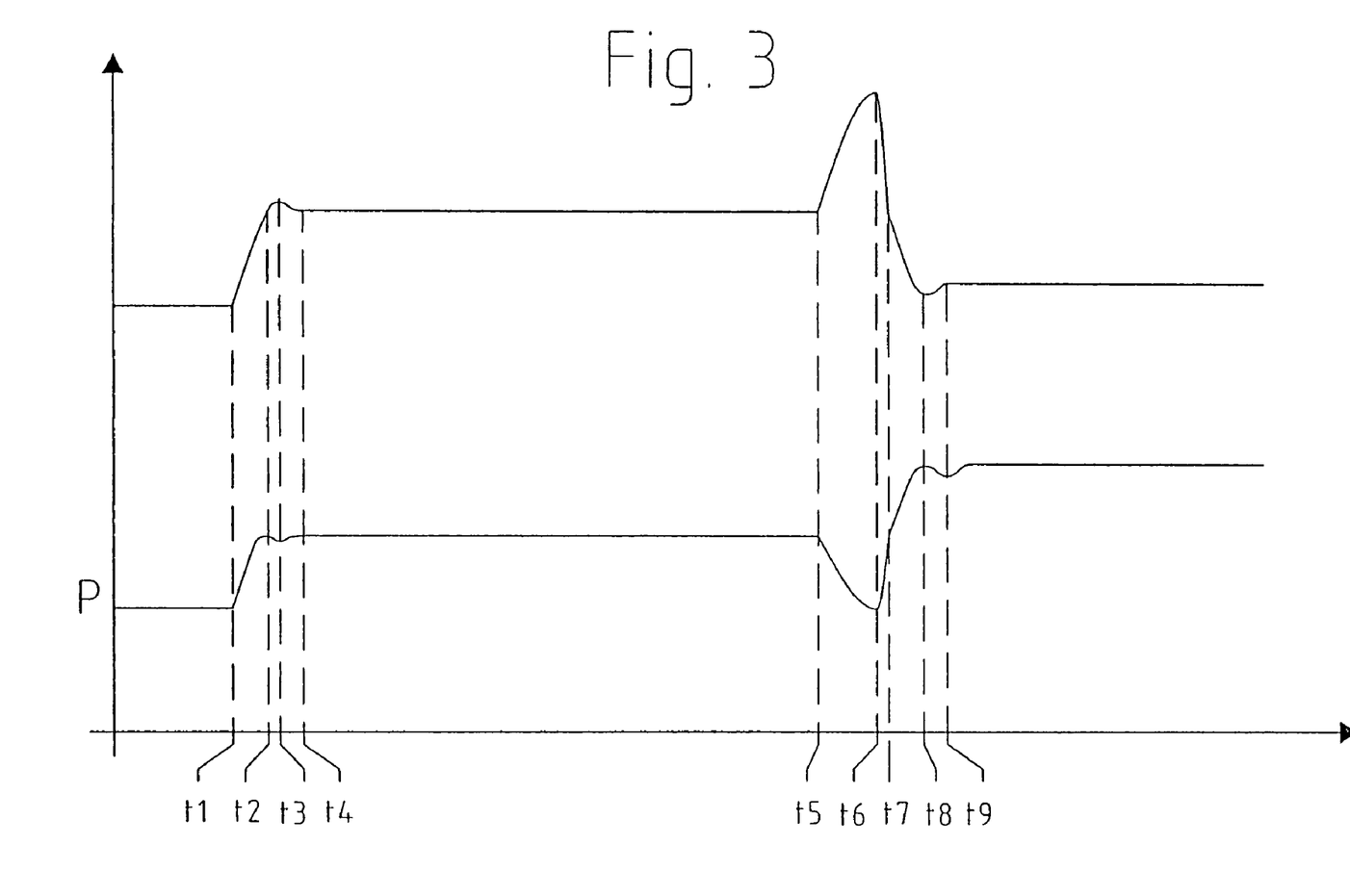
FIG. 3 a variant of the method of the invention, improved still further.

FIG. 3 shows a further embodiment of the present invention, in which the yield losses resulting from variation of the operational setting are reduced even more. The x-axis and y-axis plot the same variables as in the other Figures. In these curves, too, variation of the operational setting begins at time t1.

In the example shown, the power yield increases simultaneously to a maximum value. If the amount of variation is further increased, the power yield declines, i.e. the maximum yield and hence the optimal operational setting have been exceeded. For this reason, increasing the amount of variation is discontinued and the setting is returned to the one at which the yield maximum was achieved.

This results in an "overshoot" in the upper curve, because after reaching the maximum yield, it is firstly necessary to detect the declining power yield, of course, before the operational setting can then be adjusted to the value at which yield is maximized. This has occurred by time t4, so there is no longer a need for variation in the opposite direction, since the maximum yield has already been found. At time t5, after a predefined interval, variation of the operational setting commences, with the maximum variation being reached at time t6 and returned to the initial value by time t7. Since this resulted in a loss of yield, variation in the opposite direction is now carried out, and at time t9, after an overshoot at t8, a yield maximum is established and the corresponding setting is maintained.

Figure 4:
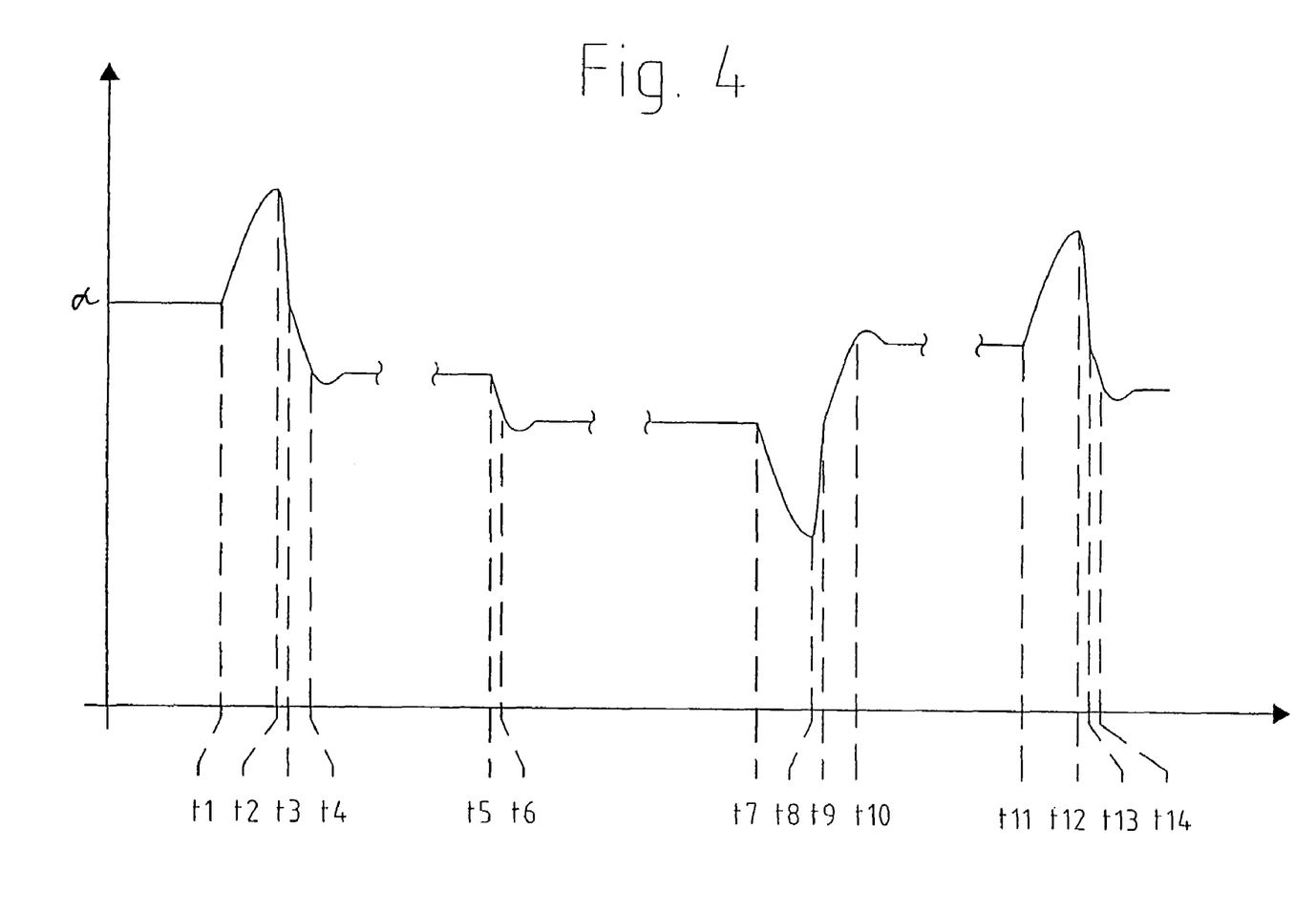
FIG. 4 a more optimized method.

Another embodiment of the invention is shown in FIG. 4. Here, the x-axis is again the time axis and the y-axis is used to plot the variation of the operational setting. The main change here compared to the methods described in the foregoing is that the direction which resulted in a yield increase during the previous variation phase is now chosen as the initial direction for variation.

Variation of the operational setting begins at time t1, reaches its maximum at time t2 and returns to its initial value at time t3. Due to the fact that no increase in power yield occurred in the assumed example, the variation is now carried out inversely, i.e. in the opposite direction. A maximum power yield is reached at time t4, and after a brief overshoot this maximum is maintained.

At time t5, following a predefined interval, the operational setting is varied once again—"by rotation", so to speak—, and the initial direction is the same as the direction that led during the previous variation phase to an increase in power yield, which was the negative half-wave. At time t6, a maximum yield is once again reached, and so this setting is maintained. Hence, the loss of yield that would have occurred with the positive half-wave has been fully eliminated.

After yet another time interval, variation of the operational setting commences once again at time t7. This time, variation begins with the negative half-wave, because this led to an increase in power yield during the previous variation phase. In is assumed in this case that the latter does not re-occur, so the maximum is reached at time t8 and the initial value is restored at time t9. The direction of variation is now reversed so that the negative half-wave is followed by a positive half-wave, with the maximum power yield being reached at time t10, and the respective value of the setting being maintained at that level.

Another variation phase begins at time t11, this time with the positive half-wave because this was the one that led during the previous variation phase to an increase in power yield. The maximum yield is reached at time t12, and at time t13 the setting has been returned to its initial setting. Owing to the fact that a yield maximum is reached at time t14 in this example, the setting is maintained, with the consequence that the following variation phase will begin with the negative half-wave.

Figure 5:
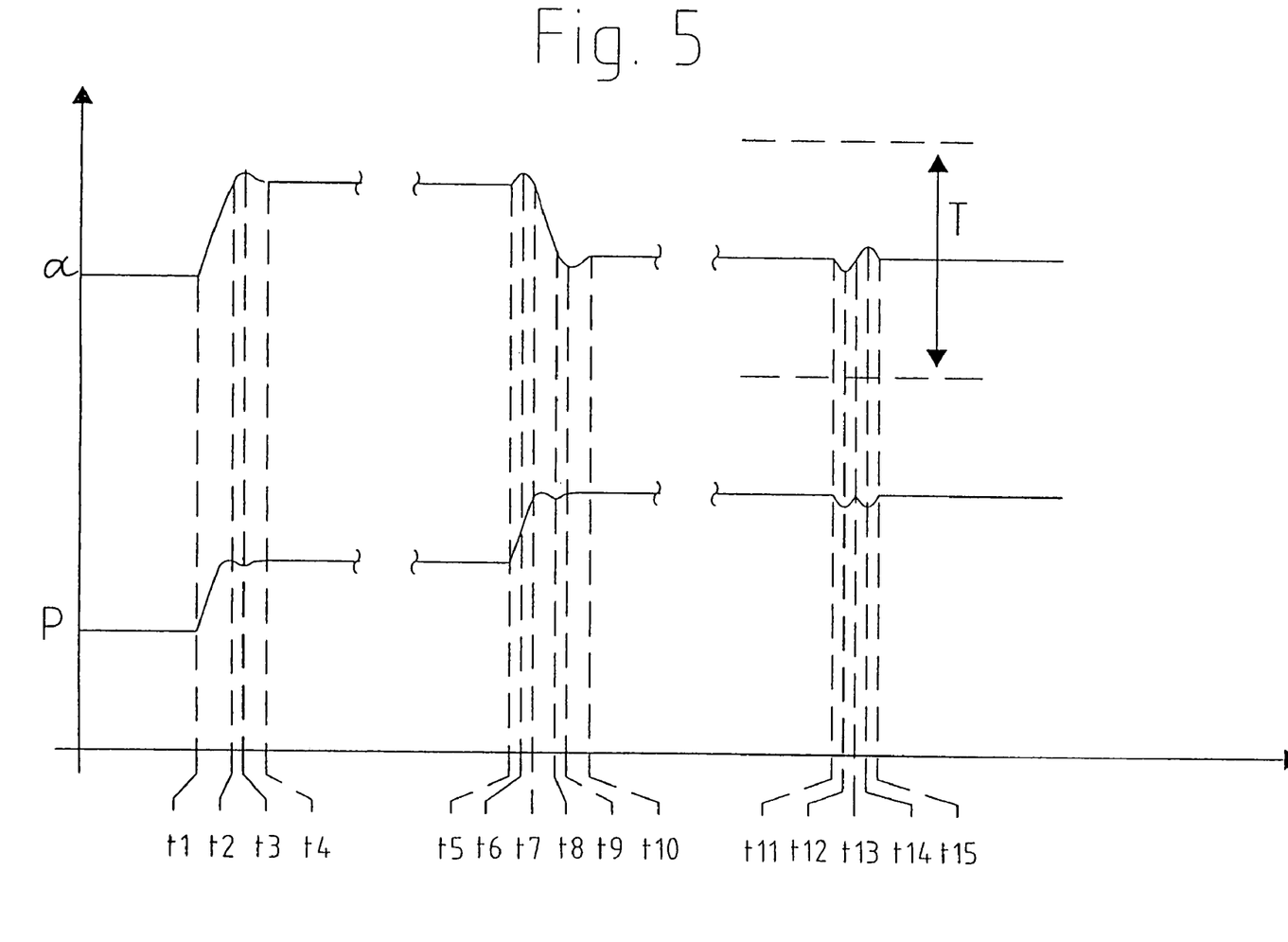
FIG. 5 a method according to the invention, optimized yet further to maximize the power yield.

FIG. 5 shows a further improved embodiment of the present invention. In said Figure, the x-axis is again the time axis, while the upper portion of the y-axis is used to plot the change in an operational setting and the lower portion to show the variation in power yield. In this embodiment of the method according to the invention, reductions in yield are limited still further as a result of the variation. This is achieved with the method according to the invention, in that the direction of variation is reversed when a reduction in power yield is detected. If a reduction in yield re-occurs after reversing the direction of variation, the variation is stopped.

In FIG. 5, the variation begins at time t1 with a positive half-wave, and the maximum yield is reached at time t2. After a brief "overshoot" (t3), the maximum yield at time t4 is set and maintained for a predefined period of time until a new variation begins at time t5.

The new variation now begins with a positive half-wave. However, a loss of yield already becomes evident at time t6. For this reason, the direction of direction is reversed and the negative half-wave of the variation of the operational setting begins at time t7. A maximum power yield is reached at time t8, and after a brief overshoot (t9) this setting is maintained at time t10. After another predefined time interval, the operational setting period is varied once again at time t11.

Because the negative half-wave in the previous variation phase led to an increase in power yield, the current variation phase also begins with the negative half-wave. By time t12, it has been detected that the latter direction of variation has led to a reduction in yield, so the direction of variation is reversed with the result that the initial value is reached again at time t13 and the positive half-wave begins.

At time t14, it is detected that the latter direction of variation is causing a loss of power yield, and variation is stopped. At time t15, the operational setting has returned to its initial setting.

In order to illustrate the main advantage of this embodiment, the predefined range of variation (T) has been marked into the Figure in both directions relative to the initial setting. Owing to the much smaller amplitude of variation in respect of the operational setting, the reductions in yield are also much less for this range of variation. The possibility of achieving a significant increase in power yield is therefore offset by a negligible loss of yield in the event that the initial operational setting is already the optimal setting.

In addition to the equalisation of unavoidable manufacturing and assembly tolerances that this invention makes possible, the proposed method according to the invention also enables an increase in power yield to be achieved when ambient operating conditions, such as wind direction, change, provided that the change is still within the tolerance band of the wind turbine controller. If, for example, the wind direction changes by only a small amount, the azimuth setting will not be activated as a consequence of the change in wind direction. Despite this, a slight change in flow angle results in a slight loss of power yield. By applying the method according to the invention, this loss can be balanced out when the azimuth setting is routinely varied.

It is also possible to compensate for defects resulting from assembly. An indication error by the wind vane, due to a defect during assembly, for example, can be compensated by the controller of the invention, provided the error is within the tolerance range of the wind turbine controller. By this means, it is possible to optimize a non-optimized energy yield resulting from the wind vane outputting incorrect data.

The invention is preferably to be used in conjunction with a set of operating parameter settings. Preferred parameters are the pitch setting (rotor blade pitch angle setting), the azimuth setting (rotor setting) and the excitation current of the generator for defining the generator torque.

Depending on the wind conditions, there is a set of parameters for the most diverse parameter settings, and the set of parameters can be stored in the form of a table. On the basis of the wind speed that is then measured, an optimal tip speed ratio (the ratio of the rotor blade tip speed to the wind speed) can be derived for the specific type of wind turbine to obtain a maximum energy yield. Since the torque available at said wind speed is known as a result of the known rotor parameters, an optimal generator torque can be calculated on the basis of specifications in the table.

Disadvantages arise if the generator torque is not adjusted to the tip speed ratio. If the generator torque is too low, the tip speed ratio increases and the rotor accelerates in an undesirable way, because the wind is supplying an appropriate amount of energy. If the generator torque is too high, in contrast, the rotor is restrained too much, with the result that the rotor is too slow and is unable to extract the maximum possible energy from the wind. However, since the generator torque is directly proportional to the level of excitation current, a setting can be derived for influencing and optimizing the wind turbine.

Another option provided by applying the invention is that the azimuth can be adjusted so that any yaw angle is kept as low as possible, and that the pitch angle of the blades can be set to achieve a maximum torque, and hence to extract a maximum of energy from the wind.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for controlling a wind turbine, the method comprising:
   specifying tolerance limits as a predefined range for at least one operational setting within which range deviations of the at least one operational setting from target are acceptable; and
   varying the at least one operational setting within the predefined range.

2. The method of claim 1, further comprising reversing a direction of variation if a power yield has decreased.

3. The method of claim 1 wherein varying the at least one operational setting includes performing variations at predefined time intervals.

4. The method of claim 3, further comprising varying the time intervals in response to predefined ambient and/or operating conditions.

5. The method of claim 1 wherein varying the at least one operational setting includes varying by a predefined amount in one direction, starting from an initial setting, or successively in two opposing directions.

6. The method of claim 1, further comprising detecting a tip speed ratio of a rotor blade contemporaneously with the variation of the at least one operational setting.

7. The method of claim 1, further comprising varying a rotor blade pitch angle and/or an azimuth setting and/or a generator torque.

8. A method for controlling a wind turbine, the method comprising:
   providing a predefined range defined by a first limit value for at least one operational setting and a second limit value for the at least one operational setting such that a deviation of the at least one operational setting within the predefined range is acceptable; and
   varying the at least one operational setting within the predefined range based at least in part on an output from a controller of the wind turbine.

9. The method of claim 8, wherein the predefined range includes an ideal setting for the at least one operational setting, the ideal setting corresponds to a maximum yield for the wind turbine.

10. The method of claim 8, wherein providing the predefined range comprises determining the first limit value and the second limit value such that the wind turbine outputs a maximum yield when the at least one operational selling is between the first limit value and the second limit value.

11. The method of claim 8, further comprising determining a waveform used to vary the at least one operational setting.

12. The method of claim 8, wherein varying the at least one operational setting further comprises varying at least one of a rotor blade pitch angle, an azimuth setting, and a generator torque.

13. The method of claim 8, wherein varying the at least one operational setting further comprises determining the predefined range such that any deviation of the at least one operational setting outside of the predefined range is unacceptable.

* * * * *

UNITED STATES PATENT AND TRADEMARK OFFICE
CERTIFICATE OF CORRECTION

| | |
|---|---|
| PATENT NO. | : 7,484,933 B2 |
| APPLICATION NO. | : 11/444859 |
| DATED | : February 3, 2009 |
| INVENTOR(S) | : Aloys Wobben |

It is certified that error appears in the above-identified patent and that said Letters Patent is hereby corrected as shown below:

Column 6
Line 64, "operational selling is" should read --operational setting is--.

Signed and Sealed this

Sixteenth Day of March, 2010

David J. Kappos
*Director of the United States Patent and Trademark Office*